United States Patent
Wang et al.

(10) Patent No.: US 9,426,779 B2
(45) Date of Patent: Aug. 23, 2016

(54) DETERMINING PAGING FRAMES IN A WIRELESS NETWORK

(71) Applicant: InterDigital Technology Corporation, Wilmington, DE (US)

(72) Inventors: Peter S. Wang, E. Setauket, NY (US); Stephen E. Terry, Northport, NY (US); Jin Wang, Princeton, NJ (US)

(73) Assignee: INTERDIGITAL TECHNOLOGY CORPORATION, Wilmington, DE (US)

( * ) Notice: Subject to any disclaimer, the term of this patent is extended or adjusted under 35 U.S.C. 154(b) by 0 days.

(21) Appl. No.: 14/835,281

(22) Filed: Aug. 25, 2015

(65) Prior Publication Data

US 2015/0365916 A1 Dec. 17, 2015

Related U.S. Application Data

(63) Continuation of application No. 13/316,718, filed on Dec. 12, 2011, now abandoned, which is a continuation of application No. 12/022,893, filed on Jan. 30, 2008, now Pat. No. 8,077,677.

(60) Provisional application No. 60/887,440, filed on Jan. 31, 2007.

(51) Int. Cl.
*H04W 52/54* (2009.01)
*H04W 68/02* (2009.01)
*H04W 52/02* (2009.01)
(Continued)

(52) U.S. Cl.
CPC .............. *H04W 68/02* (2013.01); *H04W 8/186* (2013.01); *H04W 52/0216* (2013.01); *H04W 52/0219* (2013.01); *H04W 52/545* (2013.01); *H04W 68/025* (2013.01); *H04W 76/048* (2013.01); *H04L 1/0007* (2013.01); *H04W 72/0446* (2013.01); *H04W 84/18* (2013.01)

(58) Field of Classification Search
CPC ......... H04W 52/548; H04W 72/0446; H04W 84/20; H04L 1/0007; H04B 1/707; H04B 7/2678
See application file for complete search history.

(56) References Cited

U.S. PATENT DOCUMENTS 6,023,477 A * 2/2000 Dent .................... H04B 7/2675
370/350
6,650,629 B1 * 11/2003 Takahashi ............. H04W 84/20
370/335

(Continued)

FOREIGN PATENT DOCUMENTS

EP 0 796 025 9/1997
EP 0 973 349 1/2000

(Continued)

OTHER PUBLICATIONS

Catt, "Transmission Mechanism of Paging Indicators", 3GPP TSG-RAN WG2#56, Riga, Latvia, Nov. 6-10, 2006, R2-063275.

(Continued)

*Primary Examiner* — Raj Jain
(74) *Attorney, Agent, or Firm* — Volpe and Koenig, P.C.

(57) ABSTRACT

A paging frame may be determined from a combination of a first value divided by a second value and a WTRU identifier modulo the second value. The WTRU identifier may be related to an international mobile subscriber identification (IMSI) value of the WTRU.

33 Claims, 6 Drawing Sheets

(51) Int. Cl.
    *H04W 8/18*     (2009.01)
    *H04W 76/04*    (2009.01)
    *H04W 84/18*    (2009.01)
    *H04W 72/04*    (2009.01)
    *H04L 1/00*     (2006.01)

(56) References Cited

U.S. PATENT DOCUMENTS

| | | | |
|---|---|---|---|
| 6,983,009 B2* | 1/2006 | Lomp | H04B 1/707 370/342 |
| 8,077,677 B2 | 12/2011 | Wang et al. | |
| 2004/0023672 A1 | 2/2004 | Terry | |
| 2005/0117553 A1* | 6/2005 | Wang | H04B 7/2618 370/338 |
| 2005/0277429 A1* | 12/2005 | Laroia | H04W 68/025 455/458 |
| 2005/0288040 A1 | 12/2005 | Charpentier et al. | |
| 2006/0104225 A1 | 5/2006 | Kim et al. | |
| 2009/0154408 A1* | 6/2009 | Jeong | H04W 76/02 370/329 |
| 2015/0365916 A1* | 12/2015 | Wang | H04W 68/025 370/329 |

FOREIGN PATENT DOCUMENTS

| | | |
|---|---|---|
| WO | 00/52948 | 9/2000 |
| WO | 01/03460 | 1/2001 |
| WO | 0251171 A2 | 6/2002 |

OTHER PUBLICATIONS

Motorola, "Paging Procedures and Channel Structure for E-UTRA", 3GPP TSG RAN2 LTE AdHoc, Cannes, France, Jun. 27-30, 2006, R2-061992.

Nokia, "Definition of the DRX parameter in RNSAP Paging Request message," TSG-RAN Working Group 3, meeting #9, TSGR3#9(99)J77 (Dec. 6-10, 1999).

Siemens AG, "Description of DRX for TDD," TSG-RAN Working Group 2 (Radio layer 2 and Radio layer 3), TSGR2#6(99)853 (Aug. 16-20, 1999).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V0.4.0 (Jan. 2007).

Third Generation Partnership Project, "Technical Specification Group Radio Access Network; Evolved Universal Terrestrial Radio Access (E-UTRA); User Equipment (UE) procedures in idle mode (Release 8)," 3GPP TS 36.304 V8.0.0 (Dec. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.3.0 (Dec. 2007).

Third Generation Partnership Project, "Technical Specification Group Radio Access Network; User Equipment (UE) procedures in idle mode and procedures for cell reselection in connected mode (Release 1999)," 3GPP TS 25.304 V3.14.0 (Mar. 2004).

Third Generation Partnership Project, "Technical Specification Group Radio Access Network; User Equipment (UE) procedures in idle mode and procedures for cell reselection in connected mode (Release 4)," 3GPP TS 25.304 V4.8.0 (Mar. 2004).

Third Generation Partnership Project, "Technical Specification Group Radio Access Network; User Equipment (UE) procedures in idle mode and procedures for cell reselection in connected mode (Release 5)," 3GPP TS 25.304 V5.9.0 (Sep. 2005).

Third Generation Partnership Project, "Technical Specification Group Radio Access Network; User Equipment (UE) procedures in idle mode and procedures for cell reselection in connected mode (Release 6)," 3GPP TS 25.304 V6.9.0 (Mar. 2006).

Third Generation Partnership Project, "Technical Specification Group Radio Access Network; User Equipment (UE) procedures in idle mode and procedures for cell reselection in connected mode (Release 7)," 3GPP TS 25.304 V7.1.0 (Dec. 2006).

Third Generation Partnership Project, "Technical Specification Group Radio Access Network; User Equipment (UE) procedures in idle mode and procedures for cell reselection in connected mode (Release 7)," 3GPP TS 25.304 V7.4.0 (Dec. 2007).

Third Generation Partnership Project, "Technical Specification Group Radio Access Network; User Equipment (UE) procedures in idle mode and procedures for cell reselection in connected mode (Release 8)," 3GPP TS 25.304 V8.0.0 (Dec. 2007).

Third Generation Partnership Project, "Technical Specification Group Radio Access Network; Radio Resource Control (RRC) protocol specification (Release 1999)," 3GPP TS 25.331 V3.21.0 (Dec. 2004).

Third Generation Partnership Project, "Technical Specification Group Radio Access Network; Radio Resource Control (RRC); Protocol Specification (Release 4)," 3GPP TS 25.331 V4.17.0 (Mar. 2005).

Third Generation Partnership Project, "Technical Specification Group Radio Access Network; Radio Resource Control (RRC); Protocol Specification (Release 4)," 3GPP TS 25.331 V4.18.0 (Dec. 2007).

Third Generation Partnership Project, "Technical Specification Group Radio Access Network; Radio Resource Control (RRC); Protocol Specification (Release 5)," 3GPP TS 25.331 V5.19.0 (Dec. 2006).

Third Generation Partnership Project, "Technical Specification Group Radio Access Network; Radio Resource Control (RRC); Protocol Specification (Release 5)," 3GPP TS 25.331 V5.21.0 (Dec. 2007).

Third Generation Partnership Project, "Technical Specification Group Radio Access Network; Radio Resource Control (RRC); Protocol Specification (Release 6)," 3GPP TS 25.331 V6.12.0 (Dec. 2006).

Third Generation Partnership Project, "Technical Specification Group Radio Access Network; Radio Resource Control (RRC); Protocol Specification (Release 6)," 3GPP TS 25.331 V6.16.0 (Dec. 2007).

Third Generation Partnership Project, "Technical Specification Group Radio Access Network; Radio Resource Control (RRC); Protocol Specification (Release 7)," 3GPP TS 25.331 V7.3.0 (Dec. 2006).

Third Generation Partnership Project, "Technical Specification Group Radio Access Network; Radio Resource Control (RRC); Protocol Specification (Release 7)," 3GPP TS 25.331 V7.7.0 (Dec. 2007).

Third Generation Partnership Project, "Technical Specification Group Radio Access Network; Radio Resource Control (RRC); Protocol Specification (Release 8)," 3GPP TS 25.331 V8.1.0 (Dec. 2007).

NTT DOCOMO, Inc., "Paging Mechanism for LTE," 3GPP TSG-RAN WG2 #59bis, R2-074002, Shanghai, China (Oct. 8-12, 2007)

NTT DOCOMO, Inc., "Draft LS on signalling for paging," 3GPP TSG RAN WG2 #59bis, R2-074580, Shanghai, China (May 8-12, 2007).

Third Generation Partnership Project, "Technical Specification Group Services and System Aspects; Digital cellular telecommunications system (Phase 2+); General Packet Radio Service (GPRS); Service description; Stage 2 (Release 1998)," 3GPP TS 03.60 V7.9.0 (Sep. 2002).

* cited by examiner

# DETERMINING PAGING FRAMES IN A WIRELESS NETWORK

CROSS REFERENCE TO RELATED APPLICATIONS

This application is a continuation of U.S. patent application Ser. No. 13/316,718 filed Dec. 12, 2011, which is a continuation of U.S. patent application Ser. No. 12/022,893 filed Jan. 30, 2008, which issued as U.S. Pat. No. 8,077,677 on Dec. 13, 2011, which claims the benefit of U.S. Provisional Application No. 60/887,440, filed Jan. 31, 2007, the contents of which are incorporated by reference herein.

FIELD OF INVENTION

This application is related to wireless communications.

BACKGROUND

One of the efforts for the third generation partnership project (3GPP) long term evolution (LTE) program is to bring new technology, new architecture and new methods into the new LTE settings and configurations. The LTE program is undertaken in order to provide improved spectral efficiency, reduced latency, and better utilization of radio resources, thereby providing faster user experiences and richer applications and services with less associated cost.

With regard to mobile terminal idle mode paging reception, the LTE system may use the downlink layer 1 (L1) and layer 2 (L2) control signaling channel to signal paging indicators to groups of wireless transmit/receive units (WTRUs) with the same paging group identity. However, this may not be practical in the implementation of certain aspects of paging group handling with respect to idle mode paging fundamentals, (e.g., total system paging capacity, system paging load distribution, and flexibility in assigning WTRUs different discontinuous reception (DRX) cycle lengths within a single paging group of WTRUs).

It would therefore be beneficial to provide a method and apparatus for handling paging groups.

SUMMARY

A method and apparatus for paging group handling is disclosed. The method includes grouping wireless transmit/receive units (WTRUs) into a paging group. The paging group is assigned a paging occasion, and an existence of a page is indicated to the WTRUs.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
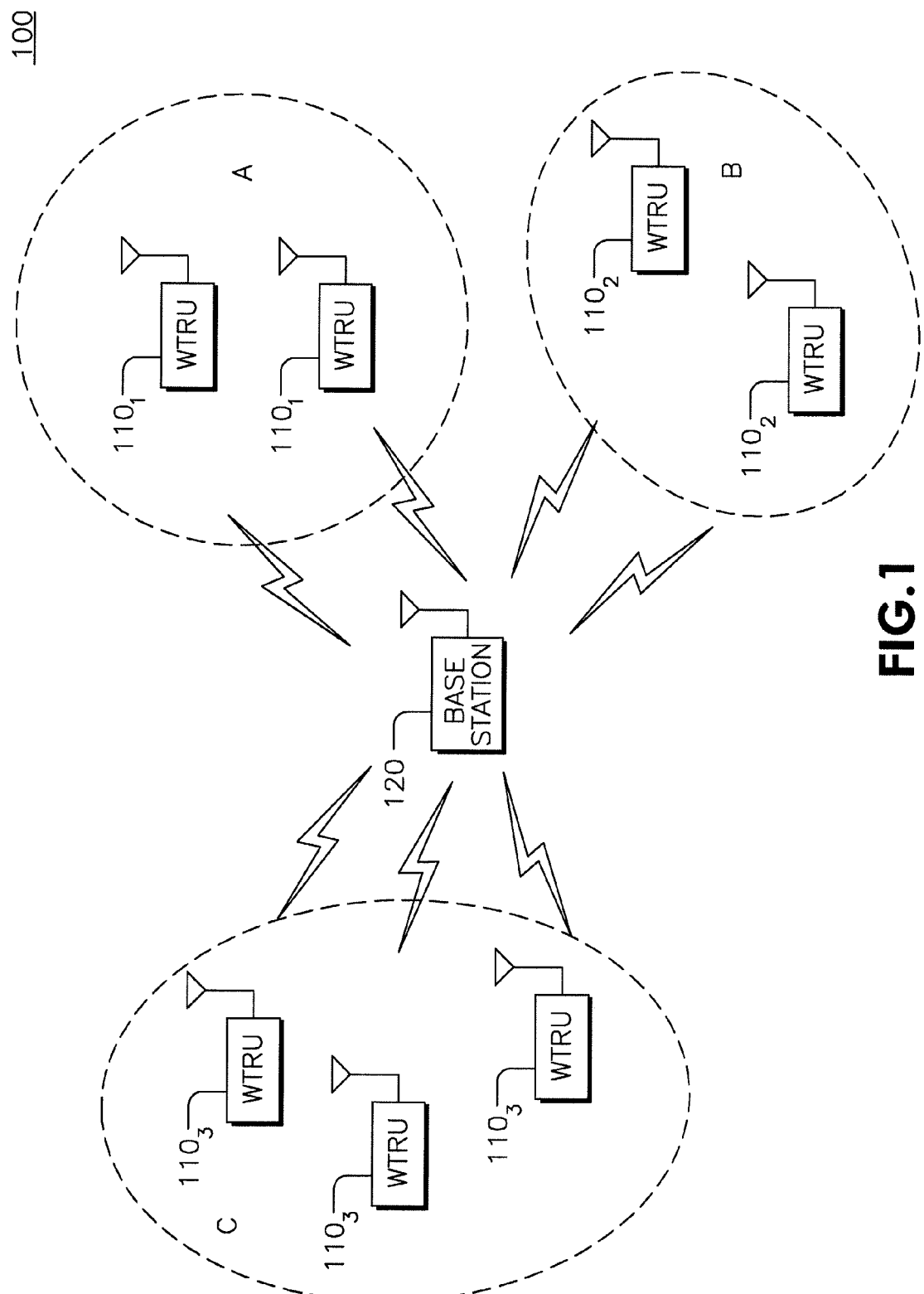
FIG. 1 shows an example wireless communication system including a plurality of WTRUs and a base station.

FIG. 1 shows a wireless communication system 100 including a plurality of WTRUs 110 and a base station 120. As shown in FIG. 1, the WTRUs 110 are separated, for purposes of example, into three paging groups designated "A" which includes WTRUs $110_1$, "B" which includes WTRUs $110_2$, and "C" which includes WTRUs $110_3$. The WTRUs 110 are in communication with the base station 120. It should be noted that, although an example configuration of WTRUs 110 and base station 120 is depicted in FIG. 1, any combination of wireless and wired devices may be included in the wireless communication system 100.

Figure 2:
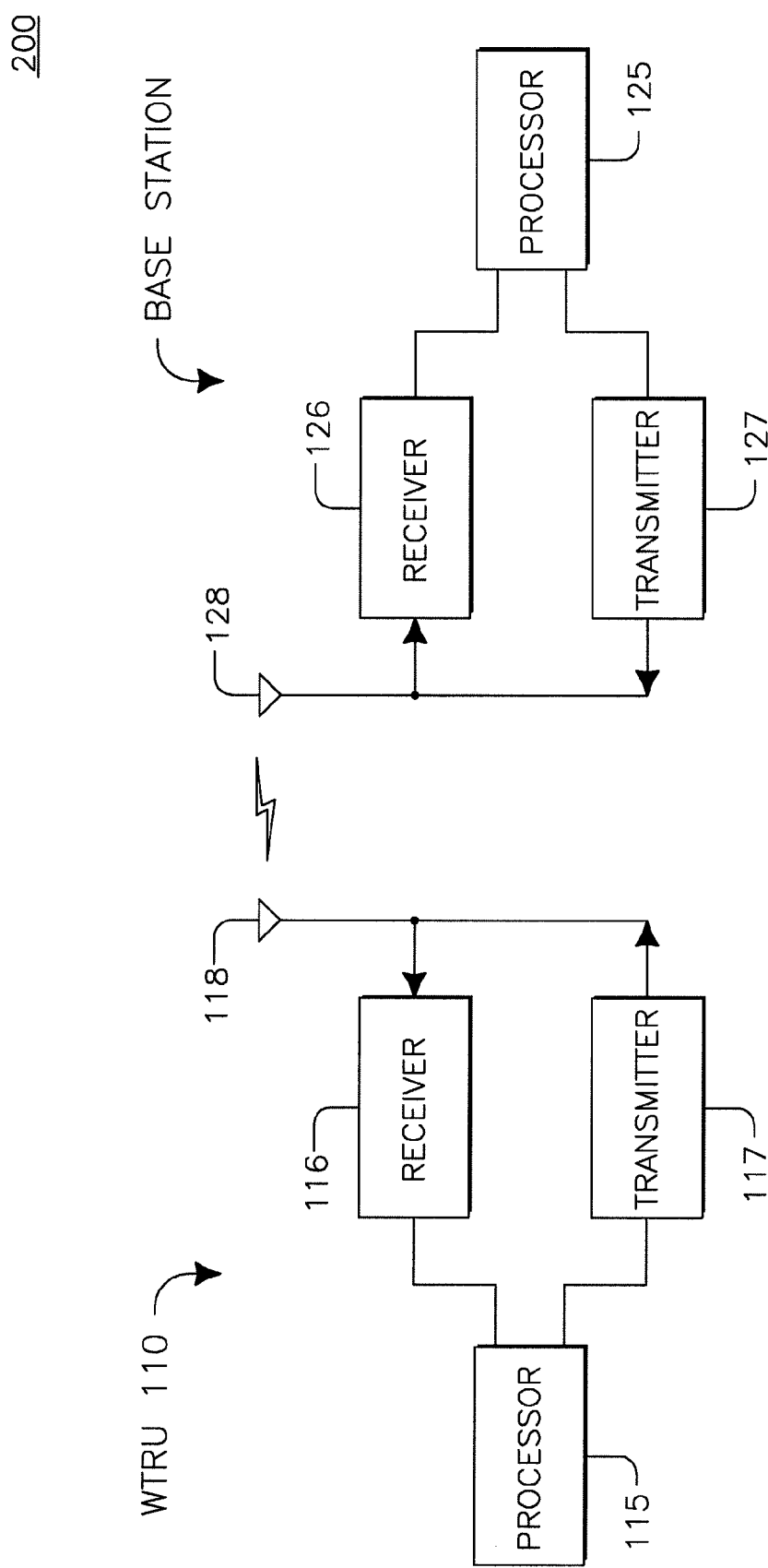
FIG. 2 is a functional block diagram of a WTRU and the base station of FIG. 1.

FIG. 2 is a functional block diagram 200 of a WTRU 110 and the base station 120 of the wireless communication system 100 of FIG. 1. As shown in FIG. 2, the WTRU 110 is in communication with the base station 120 and both are configured to perform a method of paging group handling.

In addition to the components that may be found in a typical WTRU, the WTRU 110 includes a processor 115, a receiver 116, a transmitter 117, and an antenna 118. The processor 115 is configured to perform a paging group handling procedure. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical base station, the base station 120 includes a processor 125, a receiver 126, a transmitter 127, and an antenna 128. The processor 125 is configured to perform a paging group handling procedure. The receiver 126 and the transmitter 127 are in communication with the processor 125. The antenna 128 is in communication with both the receiver 126 and the transmitter 127 to facilitate the transmission and reception of wireless data.

The arrival of an incoming page at a WTRU 110 is a random event. This should be considered in light of the requirements to maintain the WTRU 110 in idle mode as long a practicable for power savings. The WTRU 110 should "wake up" regularly to check the arrival of a page. It may be desirable, therefore, to address a suitable amount of paging groups of WTRUs 110, while allowing different WTRUs 110 within a paging group to have different DRX cycle lengths. In one example, a minimum paging occasion time unit is an LTE frame.

Figure 3:
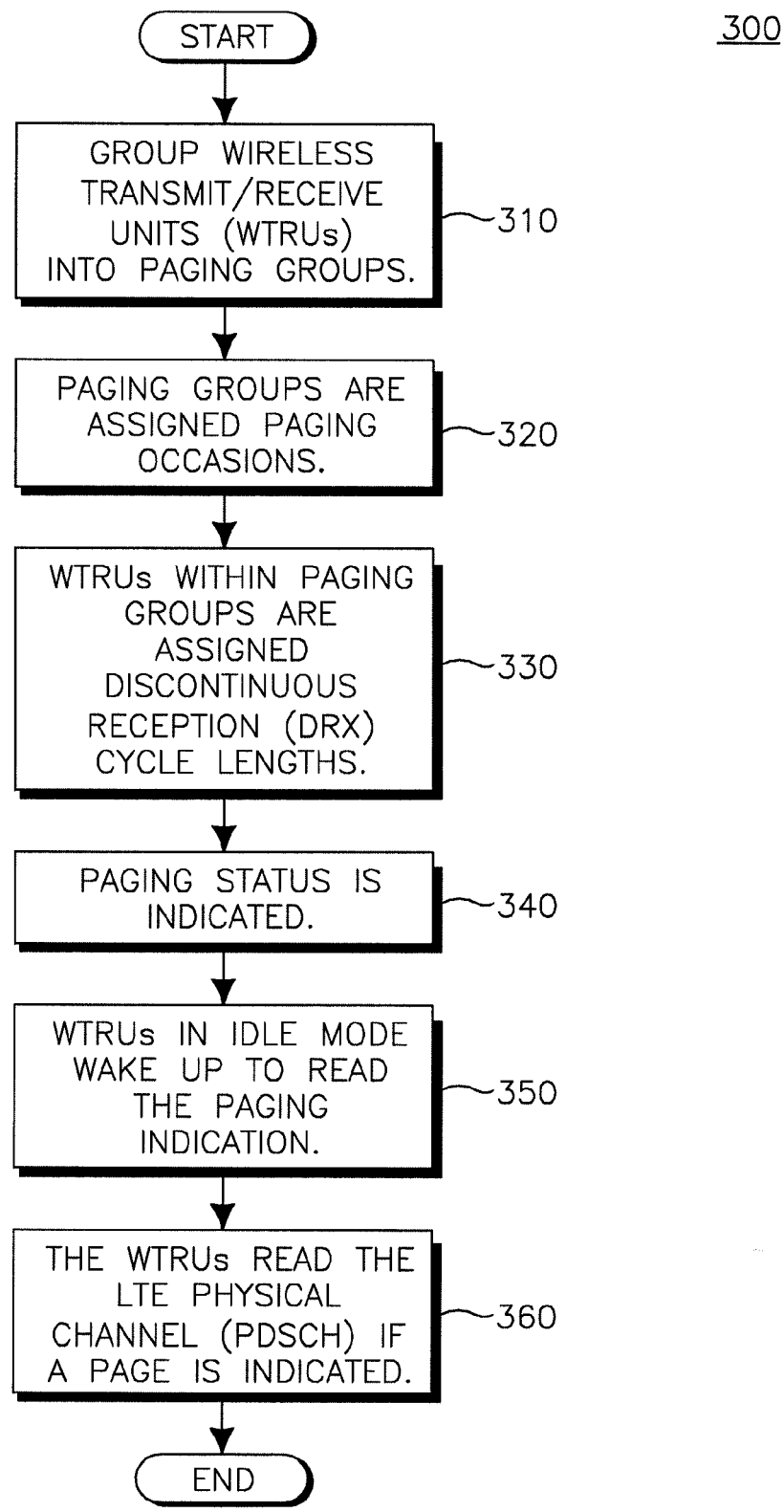
FIG. 3 is a flow diagram of a method of paging group handling.

Accordingly, FIG. 3 is a flow diagram of a method 300 of paging group handling. In step 310, WTRUs 110 are grouped into paging groups. For example, referring back to FIG. 1, WTRUs 1101 are placed in paging group A, WTRUs 1102 are placed in paging group B, and WTRUs 1103 are placed in paging group C.

In an LTE network, a paging group having a paging group identity (PG-ID) may be defined in a number of ways. For example, WTRUs can be grouped numerically by the WTRU entity, such as the international mobile subscriber identity (IMSI), or the temporary mobile subscriber identity (TMSI). Due to the temporary nature of the TMSI, however, the IMSI may be a more stable identity to be used in LTE for paging handling in idle mode. Alternatively, the paging group can be grouped logically by the network operators for the purpose of service classification or distinction, network service treatment differential and paying customer prioritization.

Where the grouping is numerical, the following example methods may be utilized: PG-ID=(IMSI mod DRX-cycle-len(gth)), or PG-ID=(IMSI div DRX-cycle-len)+(IMSI mod DRX-cycle-len). The resulting paging group, PG-ID, becomes the basic-paging-occasion-offset frame number when all the paging occasions for a particular WTRU are determined and a group of WTRUs with a similar numerical property of their IMSIs (or TMSI) with respect to the shortest DRX cycle length is defined by the LTE system. A WTRU 110 can derive its own PG-ID by the IMSI it is assigned to with one of the above equations. For example, if WTRU 110 is assigned an IMSI of 18922, and the DRX-cycle-len from the network, (e.g., published in a system information broadcast), is 32, then the PG-ID for that WTRU would be ten "10" in accordance with the first equation, (i.e., 18922 mod 32=10).

Where the grouping is logical, network operators may want to group the WTRUs 110 into sets of WTRUs based upon certain priorities or those that require differential treatment. In this case, WTRUs 110 are assigned to different logical paging groups by the service/network provider within a particular service category, within a network origin, or using other properties. Example groupings may depend on the WTRU IMSI's mobile network code (MNC), mobile country code (MCC), or on certain attributes of the WTRU's IMSI's mobile station identification number (MSIN). The network operators may use some of the following possible combinations to define the paging occasion group identity:

PG-ID=eUTRAN-Prefix||MNC||eUTRAN-suffix;
PG-ID=eUTRAN-Prefix||MCC||eUTRAN-suffix; or
PG-ID=eUTRAN-Prefix||(MSIN logical-partition)||eUTRAN-suffix, where the eUTRAN-Prefix and eUTRAN-suffix can be any value, except one that is used for another PG-ID in subsequent operations. Alternatively, a PG-ID with other desired properties may be assigned.

Since idle mode WTRUs wake up periodically to check if the E-UTRAN network has sent, or is sending a particular paging indication to it and to its group of WTRUs, paging occasions are assigned to the paging groups (step 320). A paging occasion, which may occur at the beginning of an LTE frame, defines a particular time that a WTRU should wake up to check if it is being paged. The LTE system distributes these paging occasions in the time domain so that the paging load at any time is equalized, and the paged WTRU receives the paging with minimum delay with respect to its sleep/wake-up cycle, (i.e., DRX cycle).

In step 330, WTRUs within a paging group may be assigned different DRX cycle lengths. Accordingly, for a particular paging group, with respect to the PG-ID, the system will have to determine a base-paging-occasion-offset that would be equivalent to a frame number. The subsequent and continuous paging occasions are built on top of the base-paging-occasion-offset. This base-paging-occasion-offset may be referred to as the PO-GP.

Figure 4:
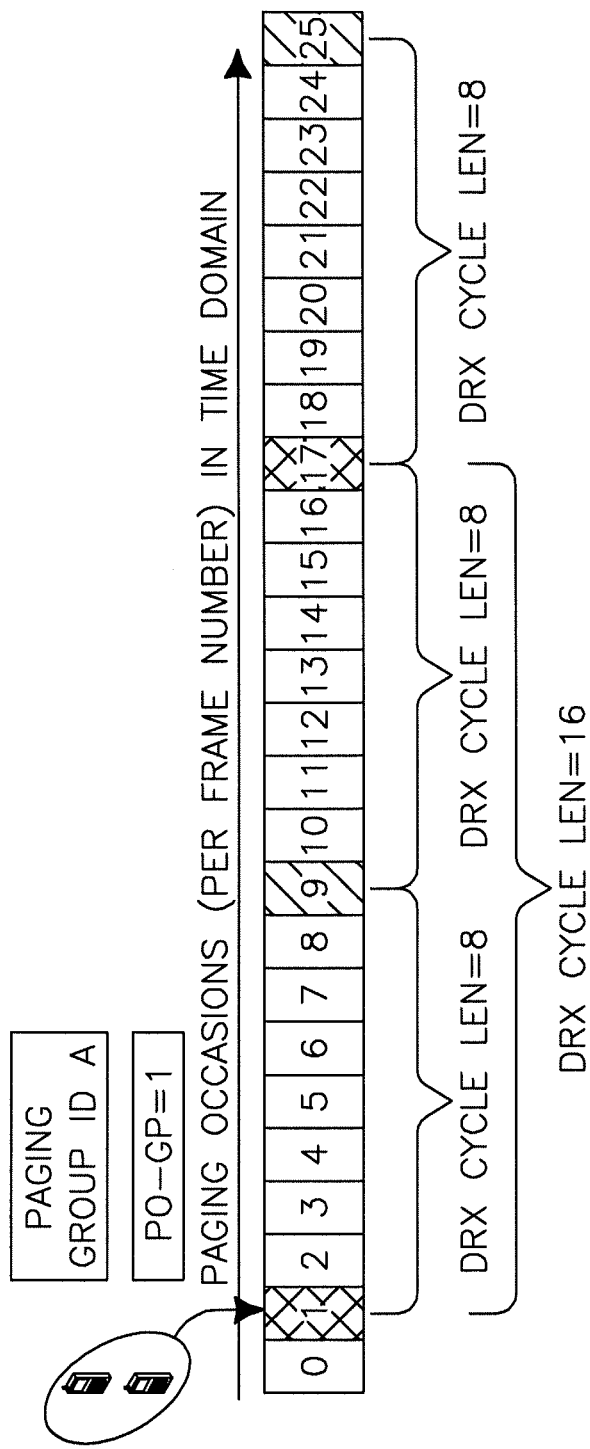
FIG. 4 shows an example base paging occasion.

In the total paging occasion distribution for different WTRUs having different DRX cycle lengths, the PO-GP indicates, at the beginning of the system frame, a number scale that is used as the offset frame number. This may be the shortest DRX cycle length by the LTE system due to the variable DRX cycle length assignment that a WTRU may have, regardless of the paging group in which it belongs. A particular WTRU 110 may have the shortest or longest DRX cycle. FIG. 4 shows an example base paging occasion 400.

FIG. 4 shows a group of WTRUs 110 within the PG-ID "A" that also include the PO-GP of "1". These WTRUs have different DRX-Cycle-lengths which are shown as 8 or 16. Accordingly, the WTRUs may expect their respective paging occasions in the time scale of system frame numbers (SFNs). For example, a WTRU with DRX-cycle-len=8 would expect its paging at SFN 1, 9, 17, 25, 33, and the like, while a WTRU with DRX-cycle-len=16 may expect its paging at 1, 17, 33, and the like. A choice between DRX-cycle-lengths may include considerations of performance versus power savings. For example, the WTRU with a DRX cycle length of 8 may consume more power, but it may have more chances to receive paging, resulting in faster incoming call reception, and the like.

Similarly to the PG-ID, the PO-PG may be determined numerically or logically. For example, the PO-PG may be determined numerically in accordance with the equation: PO-GP=PG-ID mod DRX-Cycle-Len, where the DRX-cycle-len is the minimum DRX cycle length defined by the system.

The PG-OP can also be organized logically, especially for those paging groups formed logically. In this case, the PG-ID is converted to PO-GP via a mapping table if there is no short formula to numerically translate from PG-ID to PO-GP where, for instance, the PG-IDs are not consecutively sequenced. The mapping table may also be used to achieve the intended PO-GP distribution, or to retain the flexibility of assignment, so that, for example, reassignment can be arranged easily. Table 1 below shows an example mapping table of a PG-ID to a PO-GP.

TABLE 1

| PG-ID (Allocated WTRU Group-Id) | PO-GP (Base Paging Occasion offset Group) |
| --- | --- |
| PG-ID A | 0 |
| PG-ID B | 1 |
| PG-ID C | 2 |
| PG-ID D | 2 |
| PG-ID E | 3 |
| ; ; ; | ; ; ; |
| PG-ID $N_{max-PG-ID}$ | $\phi$ |

It should be noted that $N_{max-PG-ID}$ is the maximum number of paging groups the LTE system will be able to accommodate. The $\phi$ is an absolute value smaller or equal to the shortest DRX-cycle-len minus one ($\phi$<shortest-DRX-cycle-len−1). Multiple paging groups can be assigned to the same PO-GP.

From a system perspective, the PO-GP needs to be distributed to all the frame occasions covered in the shortest DRX cycle, so as to even the paging load as well as to maintain the paging performance. Additionally, more than one paging group can be assigned to the same PO-GP so that DRX cycle length flexibility can be maintained and system paging capability may be maximized.

In an LTE WTRU and system, the overall continuous paging occasions, (i.e., paging occasion frame numbers "PO-FN") with any DRX cycle lengths are calculated by PO-FN=PO-GP+n*DRX-cycle-len, where n=0, 1, 2, . . . , such that the resulting PO-FN does not exceed the maximum system frame number limit and the DRX-cycle-len is assigned per WTRU. In this manner, the paging status for any particular WTRU 110 is indicated (step 340).

At each paging occasion, PO-FN, a WTRU 110 in idle mode DRX cycle, as well as WTRUs 110 in its paging occasion group or other groups with the same PO-GP, wake up to read the paging indication (step 350) based on the PO-GP it is in and DRX cycle length it is assigned to. Since more than one group of WTRUs 110 may be in the process of checking the paging indicator to find the paging status toward its group at the same time, the system may need to accommodate more paging groups in the limited space of the paging indicator, and, at the same time, efficiently organize the space for multiple paging group status indication.

Figure 5:
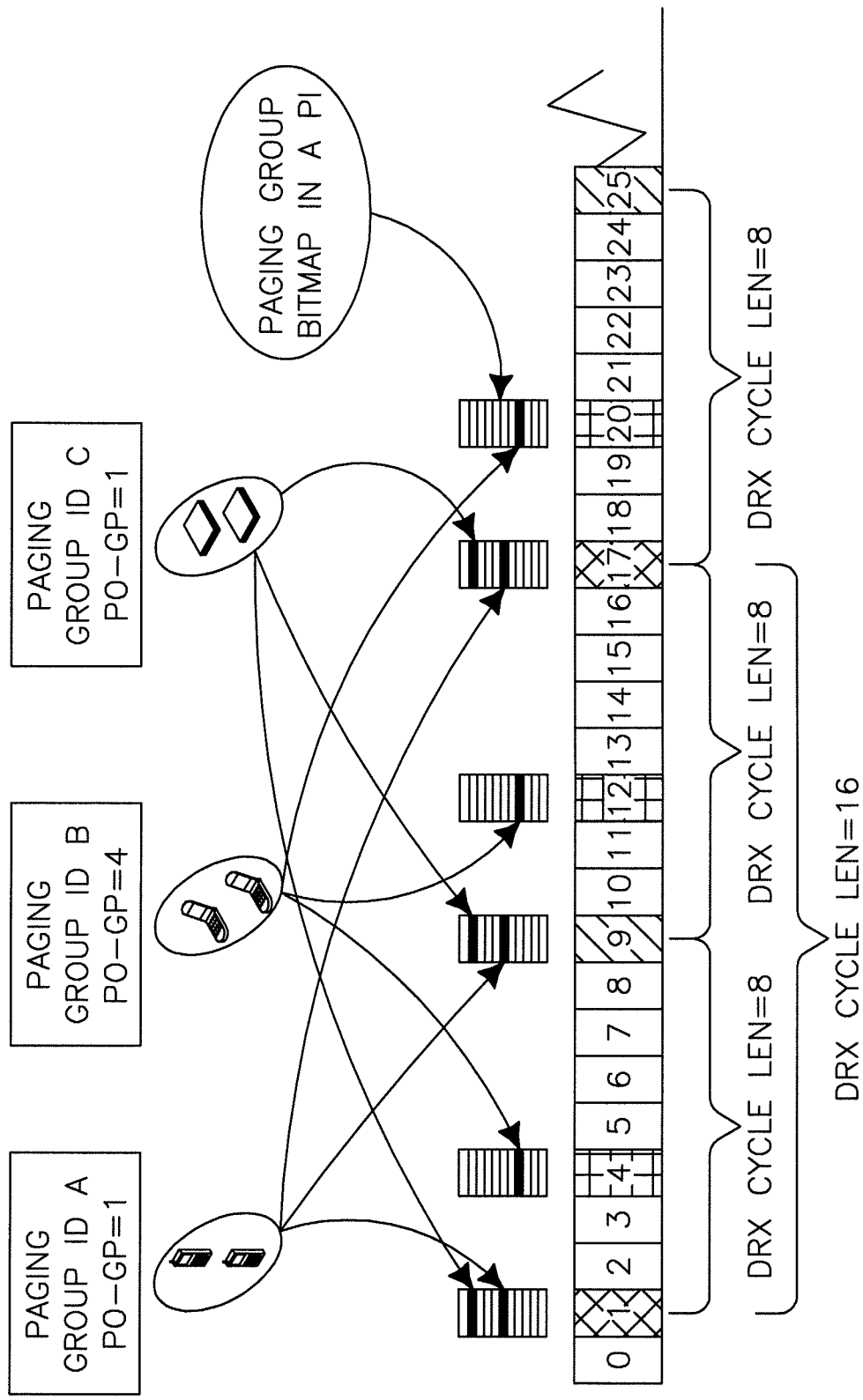
FIG. 5 shows an example bitmap representation of paging groups.

One way to accommodate the requirements is to use a bitmap method for indicating the paging status of the paging-groups belonging to a paging-occasion (PO-GP). A bit in the map, or paging status bit, would indicate whether a particular paging group is either being paged, (e.g., bit value "1") or not paged, (e.g., bit value "0"). FIG. 5 shows an example bitmap representation of paging groups 500. As shown in FIG. 5, paging group ID "A" includes a PO-GP of 1, paging group ID "B" includes a PO-GP of 4, and paging group ID "C" includes a PO-GP of 1. Each WTRU within a paging group reads the paging status bit in the bitmap during the group's paging occasion and in accordance with the WTRU's DRX-cycle-len, as indicated by the arrows shown in FIG. 5, in order to determine whether or not a page exists for the WTRU.

The bitmap construction essentially is a line of up of N bits with bit-0 representing the paging group with the smallest PG-ID, bit-1 representing the group with the next value of PG-ID, and so on. Table 2, below shows an example bitmap for one PO-GP.

TABLE 2

| Bit-0 | Bit-1 | Bit-2 | ; ; ; | Bit-n |
|---|---|---|---|---|
| PG-ID-a1 | PG-ID-a2 | PD-ID-a3 | ; ; ; | PG-ID-an | where G-ID-a1 < PG-ID-a2 < PD-ID-a3 < . . . < PG-ID-an.

There will be N, (i.e., N=shortest DRX cycle length−1), bitmaps in the system, with one for each PO-GP position. The E-UTRAN system broadcasts this PG-ID/PO-GP mapping in the system information broadcast. Table 3, below, shows a PG-ID mapping bitmap per paging occasion.

TABLE 3

|  | PO-GP 0 | PO-GP 1 | PO-GP 2 | ; ; ; | PO-GP N |
|---|---|---|---|---|---|
| Bit-0 | PG-ID a | PG-ID x1 | PG-ID y1 |  | PG-ID z1 |
| Bit-1 | PG-ID b | PG-ID x2 | PG-ID y2 |  | PG-ID z2 |
| ; ; ; |  |  |  |  | ; ; ; |
| Bit-K | PG-ID S | PG-ID xn | PG-ID yn |  | ; ; ; |

However, if the E-UTRAN system has adopted the approach described in Table 1, above, and published Table 1, then the WTRU 110 may calculate the bit position of its paging group based on the rule specified in Table 2 above.

As described previously, a WTRU 110 in idle mode wakes up at the paging occasions indicated by the PO-FN and checks on the paging indicator. Based on its assigned PG-ID and the bit position in the bitmap, the WTRU 110 checks whether its paging group, or groups, has an active page, which may include whether the bit position J in the paging-group-bitmap is set or not.

If the bit position is set, (i.e., a page is indicated), the WTRU 110 reads the LTE physical channel (PDSCH) (step 360), described by the radio bearer (RB)-allocation portion of the paging indicator, where a higher layer paging message will list the exact IMSI/TMSI of each of the WTRUs 110 being paged. If the WTRU 110 finds an exact match of its IMSI/TMSI, it indicates that a page exists for the WTRU 110.

Additionally, the bitmap is defined by the E-UTRAN and is broadcast for each of the PO-GPs in the system information when the PO-GP is given such information with respect to PG-IDs. Only one bitmap for each PO-GP needs to be broadcast. Accordingly, while the WTRUs in any particular group may have varying DRX-cycles, they are able to use the same bitmap for all PG-FNs.

Figure 6:
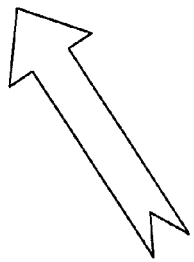
FIG. 6 is a diagram of an example LTE paging message.

In one example, an LTE Paging message may be used when a WTRU gets signaled for a definite page, and where the exact WTRU is directly addressed to reinstate the paging. FIG. 6 is an example diagram of an example LTE paging message 600.

As shown in FIG. 6, a WTRU at frame 9 receives a paging indicator (hatched), which contains a "Paging Status Bitmap" and an "RB (LTE resource block) allocation information" for the WTRU to receive the real paging message, (e.g., the LTE paging message), from another channel that carries the real paging message. This gives the timing and physical channel information. If the bitmap status bit for its paging-group is not set, then the WTRU may not read the real paging message in order to conserve power.

The LTE paging message 600 contains the paging records, (i.e., the real WTRU IMSIs), for each really paged WTRUs. A WTRU checks the bitmap to see its PG-ID bit is set and uses the RB allocation information to read the LTE paging message 600. A WTRU ascertains that it is paged when it has confirmed that its IMSI is in the paging records.

The number of IMSIs capable of being addressed in an LTE paging message represents the LTE paging capacity at its maximum, and should be designed to take peak paging load into consideration. If the defined IMSI carrying capability is not big enough, then certain WTRUs 110 may be left out of the paging confirmation and may not receive incoming calls in time.

In addition, the LTE paging message paging record should contain as many paged WTRU IMSIs as possible. If allocated RB space is limited, extensions can be made to include all the paging records/IMSIs. The extension could be made in the paging indicator RB-allocation part, where a pointer can indicate another, or auxiliary RB-allocation for the LTE paging message extension. Alternatively, the extended space may be resolved in the PCH domain, where extra space can be temporarily provided for the LTE Paging message extension.

Also, to accommodate the many IMSIs in the message as possible, signaling compression can be applied. The duplicated MCCs and MNCs do not need to be included in the message, resulting in direct list of MSINs of IMSIs in most instances, thus saving message space. The formatting of the IMSI may start with the MCC, and then move to the MNC, and lastly the MSIN. The MCC is the leading index, then the MNC. If the next MCC or MNC is not different than the previous one, then they do not need to be included. A WTRU search for an IMSI match can also take advantage of this formatting rule, skipping unmatched MCCs and MNCs by directly going to the matching MCC and MNC to increase matching process efficiency.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method performed by a wireless transmit/receive unit (WTRU), the method comprising:
    determining, by a processor of the WTRU, a paging frame, wherein the paging frame is determined from a combination of a first value divided by a second value that is based on a discontinuous reception (DRX) cycle value of the WTRU and a WTRU identifier modulo the second value;
    monitoring, by the WTRU, transmissions from a network for paging information based on the paging frame; and
    wherein the WTRU identifier is related to an international mobile subscriber identity (IMSI) value of the WTRU.

2. The method of claim 1, wherein the first value is the IMSI of the WTRU.

3. The method of claim 1, wherein the WTRU identifier is equal to the IMSI.

4. The method of claim 1, wherein the second value is equal to the DRX cycle value of the WTRU.

5. The method of claim 1, wherein the WTRU is a long term evolution (LTE) WTRU.

6. The method of claim 1, wherein the paging frame is referenced to a system frame number.

7. The method of claim 1 further comprising:
    determining paging occasions based on the determined paging frame.

8. The method of claim 1, wherein the WTRU is in an idle mode.

9. The method of claim 1, wherein the WTRU is in DRX in frames other than those related to the paging frame.

10. The method of claim 1, wherein the DRX cycle value of the WTRU is different than DRX cycle values of other WTRUs.

11. The method of claim 1, wherein the combination is an addition operation.

12. A wireless transmit/receive unit (WTRU) comprising:
    at least one processor configured to determine a paging frame, wherein the paging frame is determined from a combination of a first value divided by a second value that is based on a discontinuous reception (DRX) cycle value of the WTRU and a WTRU identifier modulo the second value;
    a receiver configured to monitor transmissions from a network for paging information based on the paging frame; and
    wherein the WTRU identifier is related to an international mobile subscriber identity (IMSI) value of the WTRU.

13. The WTRU of claim 12, wherein the first value is the IMSI of the WTRU.

14. The WTRU of claim 12, wherein the WTRU identifier is equal to the IMSI.

15. The WTRU of claim 12, wherein the second value is equal to the DRX cycle value of the WTRU.

16. The WTRU of claim 12, wherein the WTRU is a long term evolution (LTE) WTRU.

17. The WTRU of claim 12, wherein the paging frame is referenced to a system frame number.

18. The WTRU of claim 12 further comprising:
    the at least one processor is further configured to determine paging occasions based on the determined paging frame.

19. The WTRU of claim 12, wherein the WTRU is in an idle mode.

20. The WTRU of claim 12, wherein the WTRU is in DRX in frames other than those related to the paging frame.

21. The WTRU of claim 12, wherein the DRX cycle value of the WTRU is different than DRX cycle values of other WTRUs.

22. The WTRU of claim 12, wherein the combination is an addition operation.

23. A network device comprising:
    at least one processor configured to determine a paging frame, wherein the paging frame is determined from a combination of a first value divided by a second value that is based on a discontinuous reception (DRX) cycle value of a wireless transmit/receive unit (WTRU) and a WTRU identifier modulo the second value;
    a transmitter configured to send, to the WTRU, paging information based on the paging frame; and
    wherein the WTRU identifier is related to an international mobile subscriber identity (IMSI) value of the WTRU.

24. The network device of claim 23, wherein the first value is the IMSI of the WTRU.

25. The network device of claim 23, wherein the WTRU identifier is equal to the IMSI.

26. The network device of claim 23, wherein the second value is equal to the DRX cycle value of the WTRU.

27. The network device of claim 23, wherein the WTRU is a long term evolution (LTE) WTRU.

28. The network device of claim 23, wherein the paging frame is referenced to a system frame number.

29. The network device of claim 23 further comprising:
    the at least one processor is further configured to determine paging occasions based on the determined paging frame.

30. The network device of claim 23, wherein the WTRU is in an idle mode.

31. The network device of claim 23, wherein the WTRU is in DRX in frames other than those related to the paging frame.

32. The network device of claim 23, wherein the DRX cycle value of the WTRU is different than DRX cycle values of other WTRUs.

33. The network device of claim 23, wherein the combination is an addition operation.

* * * * *